United States Patent [19]
Weber

[11] Patent Number: 6,057,879
[45] Date of Patent: May 2, 2000

[54] FISHING SURVEILLANCE DEVICE

[76] Inventor: Eric D. Weber, 302 Haugh Dr., Pittsburgh, Pa. 15237

[21] Appl. No.: 08/813,363

[22] Filed: Mar. 7, 1997

Related U.S. Application Data

[60] Provisional application No. 60/013,125, Mar. 11, 1996.

[51] Int. Cl.$^7$ .................................................. H04N 7/18
[52] U.S. Cl. ............................. 348/81; 348/82; 439/459
[58] Field of Search ..................... 43/4, 17.5, 3; 348/81, 348/82, 83; 367/173, 165, 111; 358/108, 225, 99; 439/459; H04N 7/18

[56] References Cited

U.S. PATENT DOCUMENTS

| | | | |
|---|---|---|---|
| 2,760,417 | 8/1956 | Laval, Jr. ...................................... | 95/11 |
| 3,382,598 | 5/1968 | Wilson ........................................ | 43/17 |
| 4,051,523 | 9/1977 | Laikin et al. ............................... | 358/99 |
| 4,300,216 | 11/1981 | Barton, Jr. ................................. | 367/113 |
| 4,495,722 | 1/1985 | Hess ........................................... | 43/42.39 |
| 4,644,511 | 2/1987 | Asakura ...................................... | 367/101 |
| 4,661,855 | 4/1987 | Giilck ........................................ | 358/225 |
| 4,817,328 | 4/1989 | Hartley et al. ............................ | 43/43.12 |
| 4,963,962 | 10/1990 | Kruegle et al. ........................... | 358/108 |
| 5,003,723 | 4/1991 | Dutcher ..................................... | 43/42.13 |
| 5,072,540 | 12/1991 | Monzyk ...................................... | 43/4 |
| 5,205,061 | 4/1993 | Echols, Jr. ................................. | 43/17.5 |
| 5,327,398 | 7/1994 | Wansley et al. ........................... | 367/108 |
| 5,414,951 | 5/1995 | Martin ........................................ | 43/17.5 |
| 5,463,597 | 10/1995 | Harlev ....................................... | 367/107 |
| 5,495,689 | 3/1996 | Cassem ...................................... | 43/17.1 |
| 5,546,362 | 8/1996 | Baumann et al. ........................ | 367/173 |
| 5,581,930 | 12/1996 | Langer ....................................... | 43/17 |
| 5,771,205 | 6/1998 | Currier et al. ............................. | 367/107 |
| 5,938,469 | 8/1999 | Ford et al. ................................. | 439/459 |

*Primary Examiner*—Howard Britton
*Assistant Examiner*—Tung Vo
*Attorney, Agent, or Firm*—Webb Ziesenheim Lodgson Orkin & Hanson, P.C.

[57] ABSTRACT

A submersible camera is releasably attached to a fishing line so that the submersible camera can observe the bait receiving end of the fishing line when the submersible camera and the bait receiving end of the fishing line are submerged in a body of water. The submersible camera is connected to a video monitor via video cable. By observing the bait receiving end of the fishing line on the video monitor a fisherman can obtain real time information regarding the fishing environment enabling the fisherman to make better informed decisions regarding the presence and desirability of fish, the attractiveness of the bait or lure to the fish, whether the fish are striking the bait, the appropriate time to apply a hooking yank, whether the fish is hooked and how aggressively should the fish be reeled in. This enables the fisherman to catch more desirable fish.

21 Claims, 4 Drawing Sheets

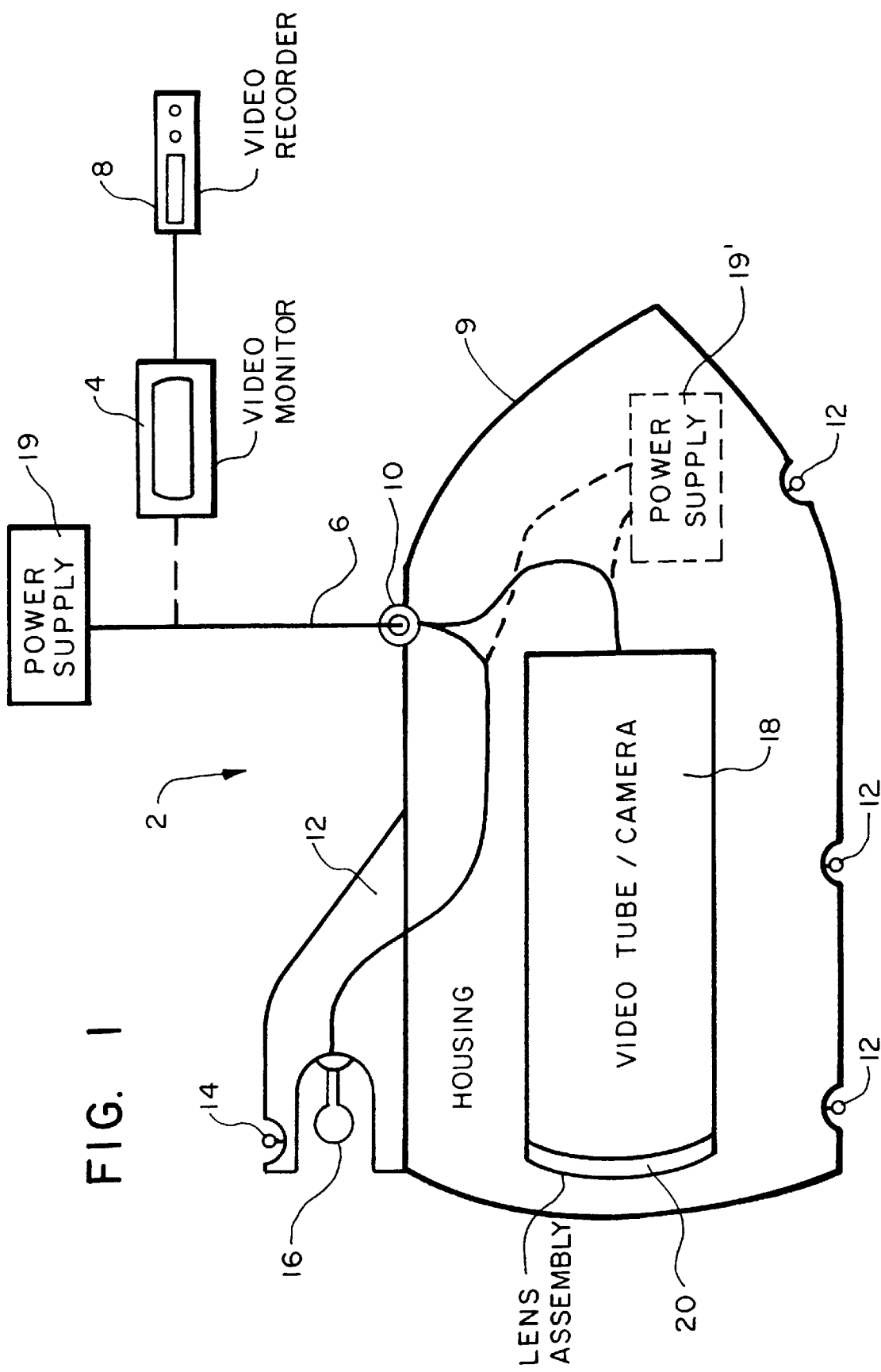

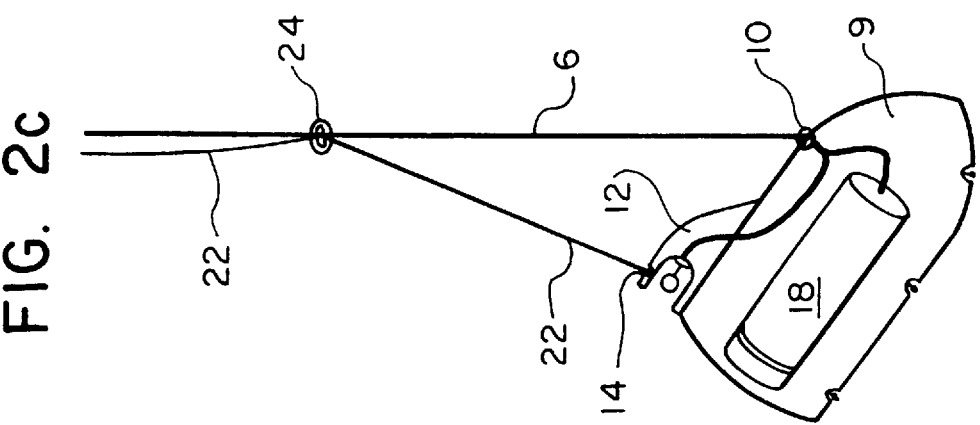
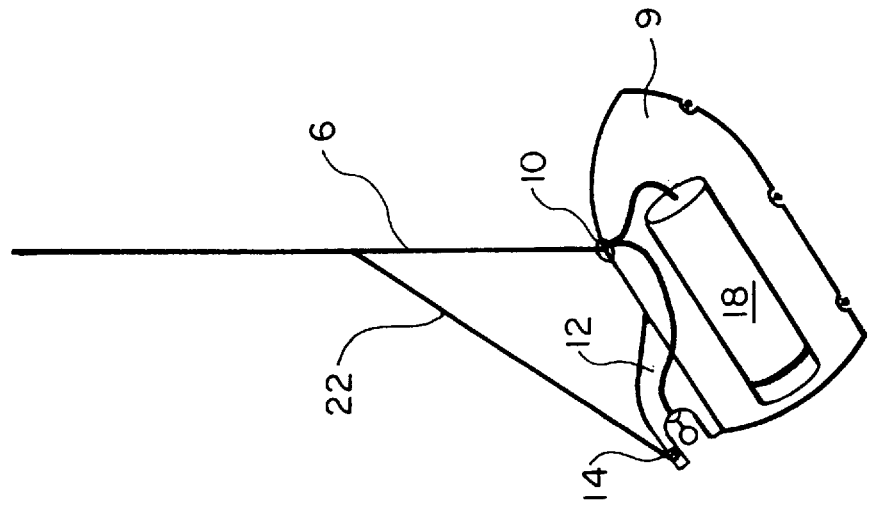
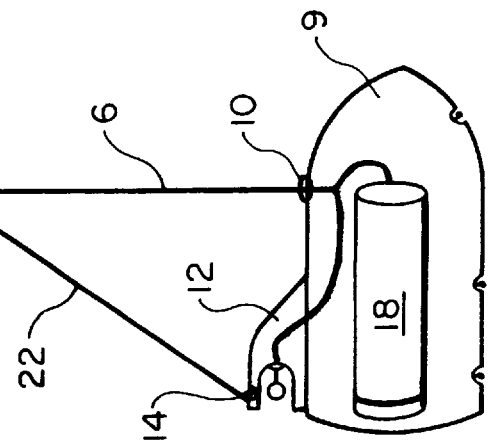

FISHING SURVEILLANCE DEVICE

This application claims priority of Provisional Application Ser. No. 60/013,125 filed Mar. 11, 1996.

BACKGROUND OF THE INVENTION

1. Field of the Invention

This invention relates to fishing and more particularly to an apparatus for viewing fish during fishing and a method for using the apparatus.

2. Description of the Prior Art

In recent years, fishermen have taken advantage of technological advances to improve their performance. These advances include satellite services that provide up to the minute ocean currents and water temperatures to better locate fish. Utilizing this information, modified radar systems are utilized to detect exact locations on the water and modified sonar is utilized to detect the exact location of fish in the water. Fishing poles are made out of space age materials for strength and sensitivity and computer designed lures imitate the exact motions of the prey they are modeled after.

In spite of these advances, fishermen still lack specific real time information regarding the fishing environment and the actions of any fish that are present. More specifically, there is no provision for detecting the presence and/or desirability of fish, the attractiveness of bait or lure to the fish, whether the rig is configured properly, whether the fish are striking the bait or merely taking investigatory nibbles, the proper time of applying a hooking yank, whether the fish is hooked and how aggressively the fish should be reeled in.

Heretofore prior art solutions have been utilized to locate fish. However, these prior art devices do not enable a fisherman to obtain accurate information about the foregoing, real time, variables.

It is therefore an object of the present invention to provide a submersible camera that is utilized with a fishing line to detect the presence and desirability of fish, the attractiveness of bait or lure to the fish, whether the rig is configured properly, whether the fish is striking the bait or lure or merely taking investigatory nibbles, the proper time to apply a hooking yank, whether the fish is hooked and how aggressively the fish should be reeled in. It is an object to provide a submersible camera that is easily attachable to a fishing line and is easy and entertaining to use. It is an object of the present invention to provide a fishing apparatus that enables a visual record of a fishing catch to be recorded. Still other objects will become apparent to others upon reading and understanding the following detailed description.

SUMMARY OF THE INVENTION

Accordingly, I have invented a fishing apparatus and a method for using the fishing apparatus.

The fishing apparatus includes a fishing line having a bait receiving end. A submersible camera connectable to a video monitor via a video cable is secured to the fishing line utilizing a release clip. The release clip enables the submersible camera to observe the bait receiving end of the fishing line when the submersible camera and the bait receiving end of the fishing line are submerged. The release clip also enables the submersible camera and fishing line to be separated. In one embodiment, the release clip separates the fishing line from the submersible camera in response to the application of a hooking yank to the fishing line or a fish strike on bait received on the bait receiving end of the fishing line. In another embodiment, the release clip includes a release line that enables the activation of the release clip to separate the fishing line from the submersible camera.

The submersible camera includes a water-tight housing, a light source attached to the housing, a video tube enclosed in the housing, and an optical lens attached to an input side of the video tube. The housing is shaped aerodynamically, preferably torpedo-shaped, so that when the submersible camera is submerged, the input side of the video tube orients to view in a direction downstream when the submersible camera is submerged in a stream of fluid flowing relative to the submersible camera. The light source and/or the video tube are powerable from a remote power source via a video cable extending between the housing and a video monitor. Alternatively, the light source and/or video tube are powerable from a power source contained in the housing.

In another embodiment, a submersible fishing camera is provided. The submersible fishing camera includes a fluid-tight housing submersible in a fluid, a video tube contained in the housing, a lens positioned on an input end of the video tube which is oriented so that the lens is adjacent a light receiving end of the housing, a light source attached to the housing, a video cable attachable to the video tube for communicating video signals from the video tube to a video monitor, a means for positioning the submersible housing once submerged and a release clip for connecting the fluid-tight housing to a fishing line. The means for positioning may include one or more fins attached to the housing for orienting the housing generally parallel to a direction of a stream of fluid flowing relative to the housing. The housing is shaped aerodynamically, preferably torpedo-shaped, so that the light receiving end of the housing is urged in a direction downstream when the housing is submerged in a stream of fluid flowing relative to the housing. The light source is preferably positioned adjacent the light receiving end of the housing.

In a method in accordance with the present invention, a fishing line is releasably connected to a submersible camera. The camera and the fishing line are submerged so that the submerged camera is positioned to view a bait receiving end of the fishing line. Visual pictures of the bait receiving end of the fishing line are transmitted to a video monitor from the submersible camera so that the bait receiving end of the fishing line can be observed on the video monitor.

A hooking yank is applied to the fishing line to hook a fish thereon and the fishing line is released from the submersible camera. The fishing line is released from the submersible camera in response to the hooking yank being applied to the fishing line or a fish striking bait received on the bait receiving end of the fishing line. Alternatively, the fishing line is released from the submersible camera by applying tension to a release line connected to a release clip attached between the submersible camera and the fishing line. Visual pictures displayed on the monitor may be recorded and the angle of the submersible camera, relative to the bait receiving end of the fishing line may be adjusted.

BRIEF DESCRIPTION OF THE DRAWINGS

FIG. 1 is a side sectional view of a submersible camera in accordance with the present invention;

FIGS. 2a–2c are side sectional views of the submersible camera of FIG. 1 attached to a video cable and an adjustment cable for adjusting the angle of the submersible camera;

DETAILED DESCRIPTION OF THE PREFERRED EMBODIES

Figure 3:
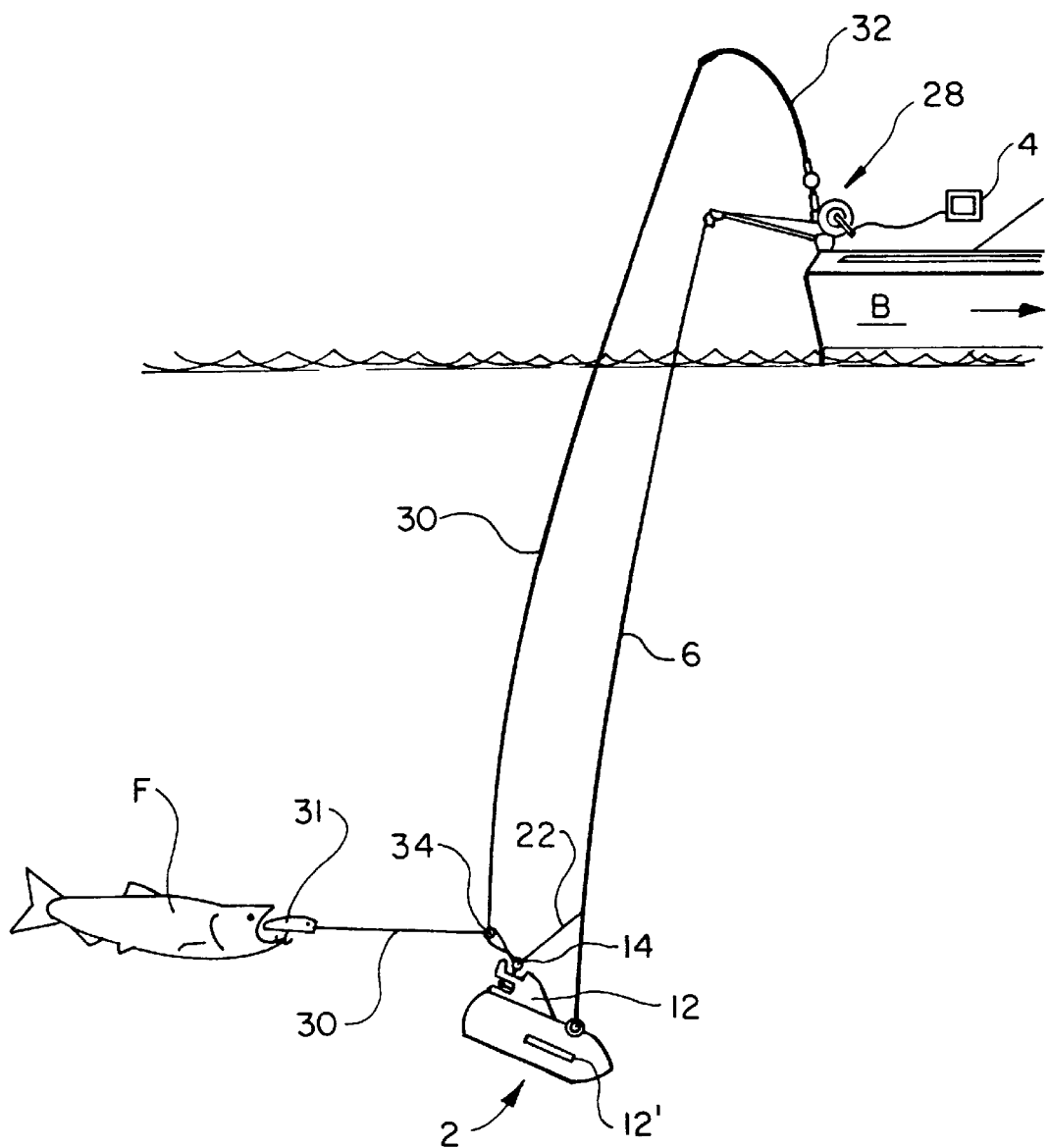
FIG. 3 is an illustration of the submersible camera of FIG. 1 attached to a fishing line and suspended in a body of water behind a moving boat.

A submersible camera 2 is connected to a video monitor 4 via a video cable 6. A video recorder 8 is optionally attached to the video monitor 4 for recording visual images displayed thereon. A microphone is optionally attached to video recorder 8 to record narration of a human operator.

The submersible camera 2 includes a torpedo-shaped housing 9 having a support eyelet 10 attached adjacent one end thereof for attaching the housing 9 to the video cable 6. A fin 12 is attached to the end of the housing 9 opposite the support eyelet 10. The fin 12 extends radially outward from the housing 9. Attached to an edge of the fin 12 positioned away from the housing 9 is a swivel eyelet 14.

The side of the fin adjacent the end of the housing 9 includes a slot 15 adapted to receive a light source 16 therein. The light source 16 is a submersible lightbulb or a lightbulb contained in a transparent housing (not shown).

A video tube or camera 18 is positioned inside the housing 9 with the longitudinal axis of the video tube 18 substantially coaxial with the longitudinal axis of the housing 9. Housing 9 is adapted to be water-tight so that fluid, and in particular water, does not enter the housing and come into contact with the video tube 18. The video tube 18 contains processing electronics (not shown) to convert video images received hereby to electronic signals. The electronic signals from the video tube 18 are transmitted to the video monitor 4 via the video cable 6.

The video cable 6 is also utilized to provide power to the video tube 18 from a power supply 19 positioned remote from the housing 9. Alternatively, a power supply 19' is positioned in the housing to provide power to the video tube 18. The power supply 19 or 19' can also provide power to the light source 16 and other gauges or devices carried by housing 9.

The end of the video tube 18 adjacent the fin 12 has a lens assembly 20 positioned thereon. The lens assembly 20 may include a fixed or replaceable lens for focusing the light received thereby onto a receiving array and/or an adjustable iris for controlling the amount of light received by the receiving array. The lens, adjustable iris and receiving array are omitted from FIG. 1 for simplicity. The end of the housing adjacent the lens assembly 20 is transparent so that light passing therethrough from the water is received by the lens asembly 20.

With reference to FIGS. 2a–2c, an adjustment cable 22 is attached between a position on the video cable 6 between the support eyelet 10 and the video monitor 4 and the swivel eyelet 14. The length of the adjustment cable 22 and the attachment of the adjustment cable 22 to the video cable 6 may be fixed. Alternatively, the adjustment cable 22 can be extended between the swivel eyelet 14 and an adjustment position above the surface of the water via a cable eyelet 24 attached to the video cable 6 between the support eyelet 10 and the video monitor 4. In this embodiment the angle of the camera 2 to view the bait receiving end of the fishing line 30 can be adjusted by adjusting the length of the adjustment cable 22 between the cable eyelet 24 and the swivel eyelet 14.

With reference to FIG. 3, the submersible camera 2 is suspended in a body of water via the video cable 6 attached to a downrigger 28 which is attached to a boat B. Also suspended in the water is a fishing line 30 having a lure or bait 31 at a bait receiving end thereof. Attached between swivel eyelet 14 and the fishing line 30 is a release clip 34. The release clip 34 releasably secures the submersible camera 2 to the fishing line 30 so that the submersible camera 2 can observe the bait receiving end of the fishing line 30 when the camera 2 and the bait receiving end of the fishing line 30 are submerged. The release clip 34 enables the submersible camera 2 and fishing line 30 to be separated. More specifically, the release clip 34 separates the fishing line 30 from the submersible camera 2 in response to the application of a hooking yank to the fishing line 30. In this manner, once a fish is hooked to the bait receiving end of the fishing line 30 the submersible camera 2 can be disengaged from the fishing line 30 to avoid potential damage to the submersible camera 2 or entanglement with the video cable 6 by the fish F trying to free itself from the fishing line 30.

By observing the video monitor 4, the fisherman can determine the appropriate moment to apply a hooking yank. Moreover, by observing the bait 31 the fisherman can assess the desirability of the lure or live bait 31 to the fish F. As shown in FIG. 3, the housing 9 of the submersible camera 2 may include additional fins 12' which enable the angle of the camera 2 tc be controlled. These extra fins 12' may be fixed in position on the housing 9 or may be adjustable on the housing 9 to enable the angle of the housing 9 to be adjusted to suit a desired fishing environment, trolling speed, or water current speed.

Figure 4:
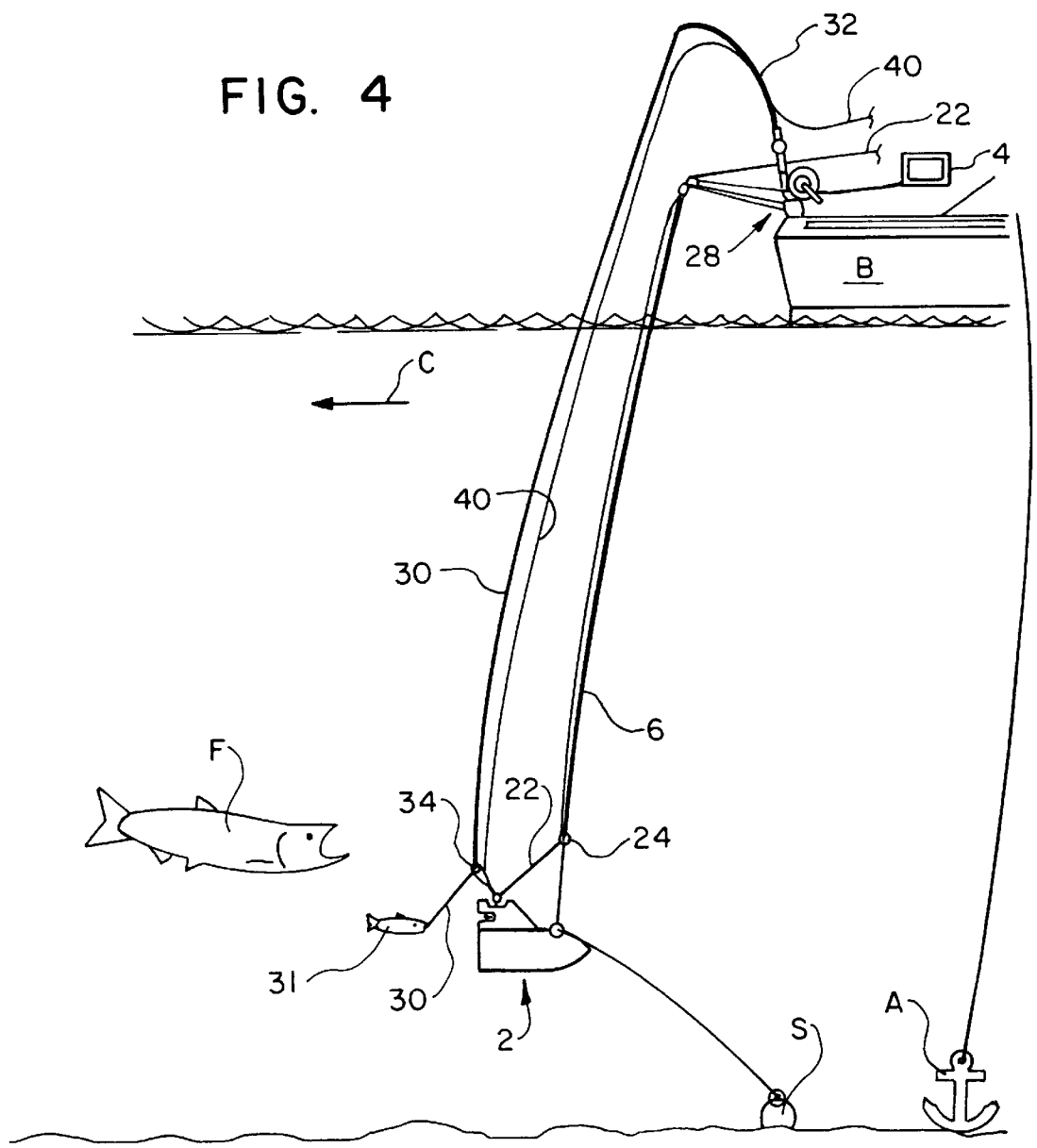
FIG. 4 is an illustration of the submersible camera of FIG. 1 attached to a fishing line and suspended in a body of water behind a stationary boat.

With reference to FIG. 4, boat B is held stationary on the surface of the water via anchor A. The submersible camera 2 is suspended in the body of water via the video cable 6 attached to the downrigger 28. A sinker S attached to support eyelet 10 is utilized to help maintain the position of the submersible camera 2 in the body of water. The fishing line 30 is also suspended in the body of water. The fishing line 30 has a lure or bait 31 attached to a bait receiving end thereof and is connected to a fishing pole 32 at an end opposite the bait receiving end. In this embodiment, the adjustment cable 22 is connected between the swivel eyelet 14 and a position on the boat via cable eyelet 24. The release clip 34 is releasably attached between the submersible camera 2 and the fishing line 30. A release line 40 is attached between the release clip 34 and a position above the surface of the water and preferably on the boat. Applying tension of a sufficient extent to the release line 40 causes the release clip 34 to release the fishing line 30 from the submersible camera 2. In the absence of tension of sufficient extent on the release line 40, the submersible camera 2 and the fishing line 30 remain connected via the release clip 34. In this manner, when a fish F is hooked on the bait receiving end of the fishing line 30 the struggle of the fish F against the fishing line 30 can be observed and/or recorded as desired.

In use, the fishing line 30 is releasably connected to the submersible camera 2. The camera 2 and the fishing line 30 are submerged so that the submerged camera 2 is positioned to view the bait receiving end of fishing line 30 and more specifically, the lure or bait 31 attached to the bait receiving end of the fishing line 30. The submersible camera 2 transmits visual pictures of the bait receiving end of the fishing line 30 to the video monitor 4 for observation by a fisherman. At an appropriate time, a hooking yank is applied to the fishing line 30 to hook a fish thereon and the fishing line 30 is released from the submersible camera 2. The fishing line 30 is released from the submersible camera 2 by the application of a hooking yank to the fishing line 30 or by a fish F striking the lure or live bait 31 received on the bait receiving end of the fishing line 30. Alternatively, the fishing line 30 is released from the submersible camera 2 by applying tension to the release line 40 connected to the release clip 34 attached between the submersible camera 2 and the fishing line 30. Visual images displayed on the video monitor 4 can be recorded by a video recorder 8. Moreover, the angle of the submersible camera 2 relative to the bait receiving end of the fishing line 30 can be adjusted via the adjustment cable 22.

As can be seen from the foregoing, the present invention provides a visual indication of the presence and desirability of fish F, the attractiveness of lure or bait 31 to the fish F, whether the fish F is striking the lure or bait 31 or merely taking investigatory nibbles, the proper time to apply a hooking yank, whether the fish F is hooked, and how aggressively the fish F should be reeled in.

The above invention has been described with reference to the preferred embodiments. Obvious modifications, combinations and alterations will occur to others upon reading and understanding the preceding detailed description. For example, the housing 9 can be permanently attached to the fishing line 30. Moreover, the present invention can be utilized to fish from freestanding structures such as a pier or bridge. Moreover, if an undesirable fish F approaches the lure or bait 31, the fisherman can move the lure or bait 31 in an undesirable manner to scare the undesirable fish F away. It is intended that the invention be construed as including all such modifications and alterations insofar as they come within the scope of the appended claims or the equivalents thereof.

I claim:

1. A fishing apparatus comprising:
    a fishing line having a bait receiving end;
    a submersible camera connectable to a video monitor via a video cable; and
    a release clip which secures the submersible camera to the fishing line so that the submersible camera relative can observe the bait receiving end thereof when the submersible camera and the bait receiving end of the fishing line are submerged.

2. The fishing apparatus as set forth in claim 1, wherein the release clip enables the submersible camera and fishing line to be separated.

3. The fishing apparatus as set forth in claim 2, wherein the release clip separates the fishing line and the submersible camera in response to at least one of (i) application of a hooking hank to the fishing line and (ii) a fish striking the bait receiving end of the fishing line.

4. The fishing apparatus as set forth in claim 2, wherein the release clip includes a release line that enables activation of the release clip to separate the fishing line from the submersible camera.

5. The fishing apparatus as set forth in claim 1, wherein the submersible camera includes:
    a housing;
    a light source attached to the housing;
    a video tube enclosed in the housing; and
    an optical lens attached to an input side of the video tube.

6. The fishing apparatus as set forth in claim 5, wherein the housing is shaped aerodynamically so that when the submersible camera is submerged, the input side of the video tube orients to view in a direction downstream relative to the submersible camera.

7. The fishing apparatus as set forth in claim 5, wherein at least one of the light source and the video tube are powerable from at least one of a power source contained in the housing and a remote power source via a video cable connected to the housing.

8. The fishing apparatus as set forth in claim 5, wherein the optical lens includes an iris for adjusting the amount of light received by the video tube.

9. A submersible fishing camera comprising:
    a fluid-tight housing submersible in a fluid;
    a video tube contained in the housing;
    a lens positioned on an input end of the video tube which is oriented so that the lens is adjacent a light receiving end of the housing;
    a video cable attachable to the video tube for communicating video signals from the video tube to a video display;
    means for positioning the submersible housing relative to a bait receiving end of a fishing line when submerged; and
    a release clip connected between the fluid-tight housing and the fishing line.

10. The submersible fishing camera as set forth in claim 9, wherein the means for positioning includes one or more fins attached to the housing for orienting the housing generally parallel to a direction of a stream of fluid flowing relative to the housing.

11. The submersible fishing camera as set forth in claim 9, wherein the housing is shaped aerodynamically so that the light receiving end of the housing is urged in a direction downstream when the housing is submerged in a stream of the fluid flowing relative to the housing.

12. The submersible fishing camera as set forth in claim 11, further including a light source and positionable to project light in a direction normal to the light receiving end of the housing.

13. The submersible fishing camera as set forth in claim 9, wherein the release clip is fixedly connected to one of the housing and the fishing line and is releasably connected to the other of the housing and the fishing line.

14. The submersible fishing camera as set forth in claim 9, wherein the release clip releases one of the fluid-tight housing and the fishing line when at least one of (i) a hooking hank is applied to the fishing line and (ii) a fish strikes the bait receiving end of the fishing line.

15. The submersible fishing camera as set forth in claim 9, further including a release line attached to the release clip for release the releasible clip from one of the fluid-tight housing and the fishing line in response to tension being applied to the release line.

16. A method of fishing comprising the steps of:
    releasably connecting a fishing line and a submersible camera by a release clip;
    submerging the camera and the fishing line so that the submerged camera is positioned to view a bait receiving end of the fishing line; and
    observing on a video monitor visual pictures of the bait receiving end of the fishing line transmitted to the video monitor from the submersible camera.

17. The method as set forth in claim 16, further including the steps of:
    applying a hooking yank to the fishing line to hook a fish thereon; and
    releasing the fishing line from the submersible camera.

18. The method as set forth in claim 16, wherein at least one of (i) a hooking yank applied to the fishing line and (ii) a fish striking bait received on the bait receiving end of the fishing line causes the fishing line and the submersible camera to separate.

19. The method as set forth in claim 17, wherein the fishing line is released from the submersible camera by applying tension to a release line connected to the release clip attached between the submersible camera and the fishing line.

20. The method as set forth in claim 17, further including the step of:

recording the visual pictures displayed on the video monitor.

21. The method as set forth in claim 17, further including the step of:

adjusting the angle of the submersible camera relative to the bait receiving end of the fishing line.

* * * * *

UNITED STATES PATENT AND TRADEMARK OFFICE
CERTIFICATE OF CORRECTION

PATENT NO. : 6,057,879
DATED : May 2, 2000
INVENTOR(S) : Eric D. Weber

It is certified that error appears in the above-indentified patent and that said Letters Patent is hereby corrected as shown below:

Column 5, line 35, after "camera", insert "relative".

Column 5, line 36, after "camera", delete "relative".

Signed and Sealed this

Tenth Day of April, 2001

*Attest:*

NICHOLAS P. GODICI

*Attesting Officer*      *Acting Director of the United States Patent and Trademark Office*